United States Patent [19]

Shiraishi et al.

[11] Patent Number: 4,740,852
[45] Date of Patent: Apr. 26, 1988

[54] DISK PRESSER MECHANISM FOR USE IN MAGNETIC RECORDING AND REPRODUCING APPARATUS

[75] Inventors: Yukiya Shiraishi; Takeshi Yamashita, both of Furukawa, Japan

[73] Assignee: Alps Electric Co., Ltd., Japan

[21] Appl. No.: 77,988

[22] Filed: Jul. 24, 1987

Related U.S. Application Data

[63] Continuation of Ser. No. 679,276, Dec. 7, 1984, abandoned.

[30] Foreign Application Priority Data

Dec. 6, 1983 [JP] Japan ............................ 58-188426[U]

[51] Int. Cl.⁴ .................... G11B 5/016; G11B 17/02
[52] U.S. Cl. ........................................ 360/99; 360/97; 360/130.3; 360/105
[58] Field of Search ................... 360/130.1–130.34, 360/97–99, 105

[56] References Cited

U.S. PATENT DOCUMENTS

| 4,040,107 | 8/1977 | Bryer ................................ 360/99 |
| 4,089,029 | 5/1978 | Castrodale ........................ 360/99 |
| 4,246,618 | 1/1981 | Bauer ............................... 360/99 |
| 4,315,289 | 2/1982 | Holecek et al. ............... 360/130.34 |
| 4,413,294 | 11/1983 | Beijer .............................. 360/99 |
| 4,541,025 | 9/1985 | Sidlu et al. ................... 360/130.3 |
| 4,621,295 | 11/1986 | Okamura ...................... 360/99 X |
| 4,630,154 | 12/1986 | Slivaiski et al. ................. 360/99 |

FOREIGN PATENT DOCUMENTS

| 57-179970 | 11/1982 | Japan ................................ 360/97 |
| 0581868 | 1/1983 | Japan ................................ 360/97 |
| 58-211358 | 12/1983 | Japan ............................ 360/130.3 |
| 2132807 | 7/1984 | United Kingdom .................. 360/97 |

OTHER PUBLICATIONS

IBM Tech. Discl. Bull., vol. 20, No.10, Mar. 78, pp.4066–4068, "Low Profile Diskette Drive" by Neubauet.

*Primary Examiner*—John H. Wolff
*Assistant Examiner*—Alfonso Garcia
*Attorney, Agent, or Firm*—Guy W. Shoup

[57] ABSTRACT

A disk presser mechanism in a magnetic recording and reproducing apparatus includes a rotatable turntable, a clamp member for clamping a disk on the turntable, a clamp arm supporting the clamp member and movable toward and away from the turntable, a drive lever operatively coupled to the clamp arm, an actuator cam for pressing the drive lever to move the clamp arm in a direction to cause the clamp member to clamp the disk on the turntable, a pad holder having a pad for confronting the disk, a spring member for urging the pad to be pressed against the disk, and an engaging portion acting between the drive lever and the pad holder for moving the pad holder away from the disk when the drive lever is released by the actuator cam to unclamp the disk.

2 Claims, 4 Drawing Sheets

DISK PRESSER MECHANISM FOR USE IN MAGNETIC RECORDING AND REPRODUCING APPARATUS

This is a continuation application from application Ser. No. 679,276 filed Dec. 7, 1984, now abandoned.

BACKGROUND OF THE INVENTION

The present invention relates to a magnetic recording and reproducing apparatus for reading information from and writing information into a magnetic disk, and more particularly to a disk presser mechanism for pressing and positioning a magnetic disk on a base.

When a magnetic disk is loaded in a magnetic recording and reproducing apparatus, a magnetic head is moved into confronting relation to a read/write region on the disk, and a pad is brought into abutment against a side of the read/write region to press and position the disk against a reference surface of a base of the apparatus body. Ths disk is thus vertically set with respect to the head, and a liner (generally made of nonwoven fabric) on an inner surface of a disk case is pressed under suitable pressure against the magnetic medium stored in the disk case to effect self-cleaning on the magnetic medium rotating in the disk case.

A conventional pad presser mechanism is attached by a leaf spring to a turning clamp arm having a clamp member on a turntable. After the disk has been loaded, the clamp arm is lowered to clamp the disk on the turntable, whereupon the pad is pressed against the disk. Alternatively, a drive lever is provided for lowering the clamp arm. When the clamp arm is pushed in a clamping direction by the drive lever pressed by an actuator cam, the drive lever simultaneously operates the pad to cause the latter to press the disk.

However, the conventional disk presser mechanism has been disadvantageous in that the force with which the clamp arm and the drive lever are lowered affects and makes irregular the force with which the pad presses the disk. As a result, the force with which the disk is pressed by the pad may be too weak to position the disk accurately, or the magnetic medium cannot be sufficiently cleaned by the liner on the inner surface of the disk case. If the disk were pressed by the pad too strongly, frictional forces generated between the inner surface of the disk case and the magnetic medium would be increased to the extent that the magnetic medium would be worn quickly or the resistance to rotation of the magnetic medium in the disk case would be increased, requiring the turntable to produce an excessive drive force that would result in an increased electric power requirement.

SUMMARY OF THE INVENTION

With the above conventional problems in view, it is an object of the present invention to provide a disk presser mechanism for use in magnetic recording and reproducing apparatus, which is capable of pressing a pad against a magnetic disk under constant pressure at all times so that the disk can reliably be positioned and a magnetic medium in a disk case can reliably be self-cleaned.

According to the present invention, there is provided a disk presser mechanism in a magnetic recording and reproducing apparatus, including a rotatable turntable, a clamp member for clamping a disk on the turntable, a clamp arm supporting the clamp member and movable toward and away from the turntable, a drive lever operatively coupled to the clamp arm, an actuator cam for pressing the drive lever to move the clamp arm in a direction to cause the clamp member to clamp the disk on the turntable, a pad holder having a pad for confronting the disk, urging means for urging the pad to be pressed against the disk, and engaging means acting between the drive lever and the pad holder for moving the pad holder away from the disk when the drive lever is released by the actuator cam to unclamp the disk. When the drive lever is depressed by the actuator cam in a direction to clamp the disk, the pad holder is independently urged by the urging means toward the disk to press the pad against the disk under a constant force at all times. The disk is now reliably positioned by the pad for appropriate contact with a magnetic medium in the disk. Since the pad presses the disk under an appropriate force, the magnetic medium is self-cleaned by a liner in a disk case. The disk as pressed by the pad is not subjected to an undue force, so that no undesired resistance to the rotation of the magnetic medium is produced. Therefore, the magnetic disk will not be worn rapidly or no unduly increased power will be consumed for rotating the magnetic medium.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
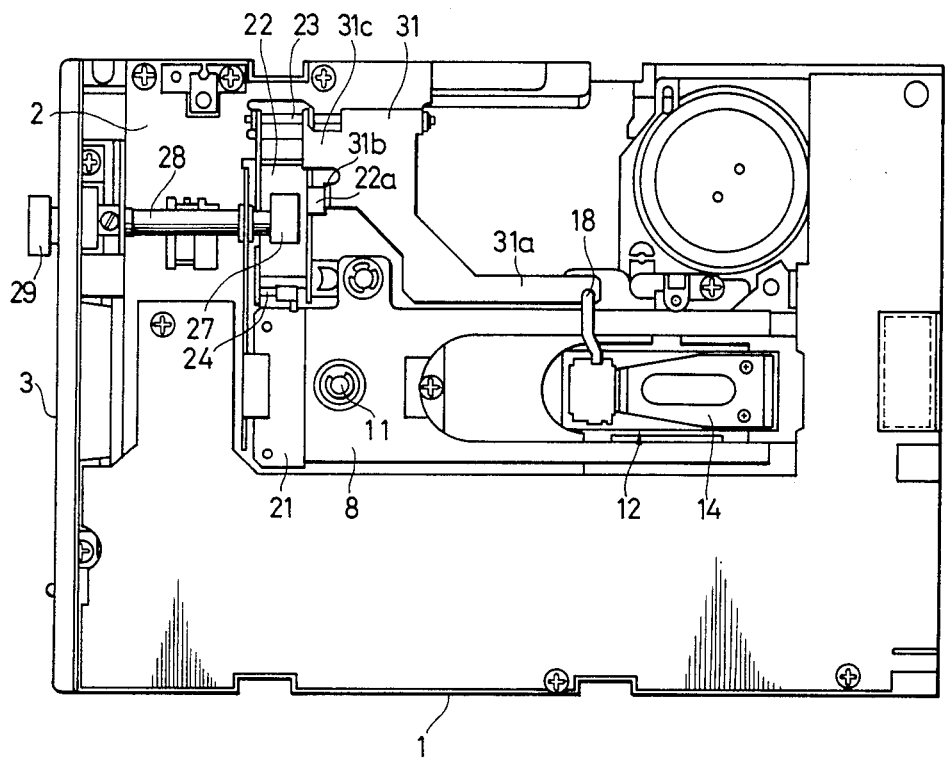
FIG. 1 is a plan view of a magnetic recording and reproducing apparatus.
Figure 3:
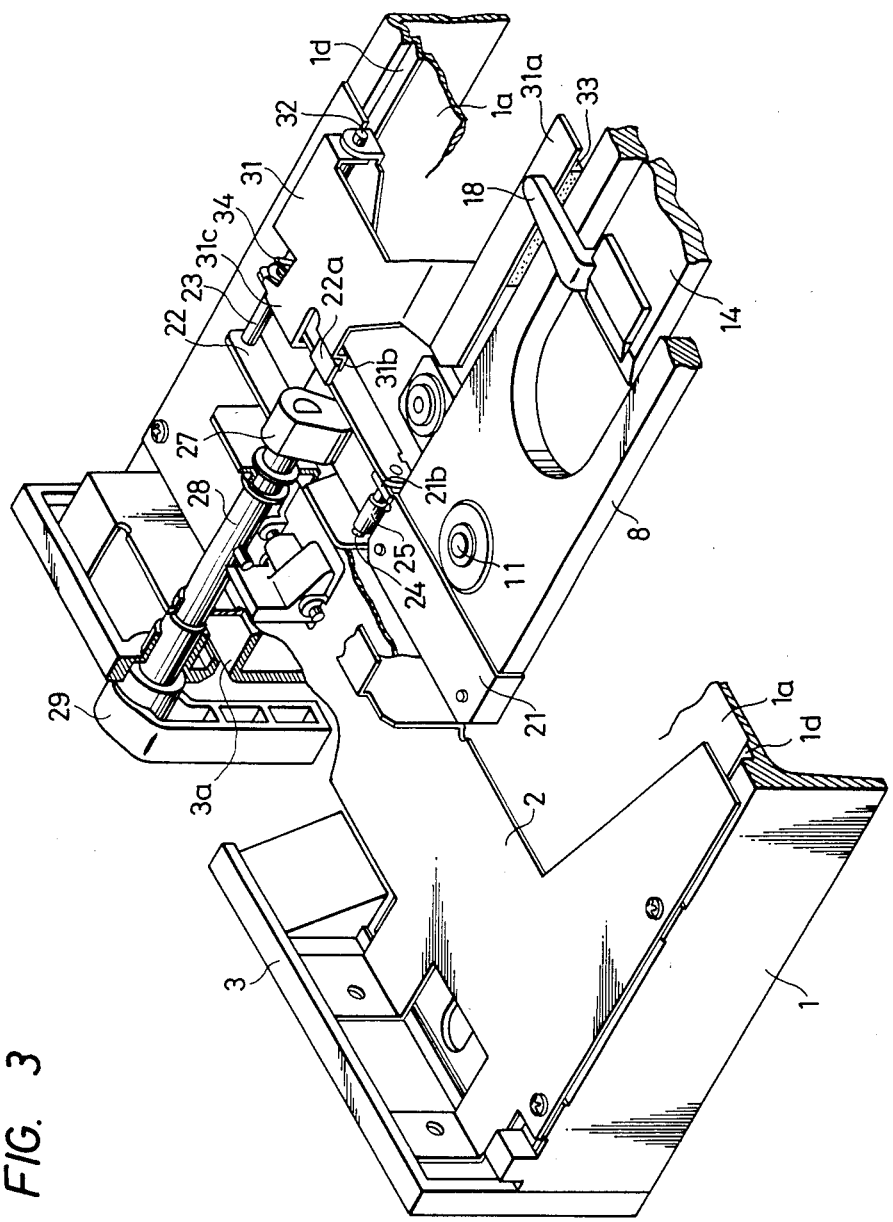
FIG. 3 is a fragmentary perspective view of a disk presser mechanism in the magnetic recording and reproducing apparatus.

A magnetic recording and reproducing apparatus in which the principles of the present invention are incorporated includes a base 1 (FIGS. 1 and 3) comprising an aluminum die casting. As shown in FIG. 3, the base 1 has a flat surface 1a including lower guide surfaces 1d on and along opposite marginal edges thereof. The apparatus also includes an upper guide plate 2 fixed to an upper surface of the base 1. A disk loading passage is defined between the upper guide plate 2 and the lower guide surfaces 1d. A front block 3 is mounted on a front face of the base 1 and has a slot 3a for the insertion of a magnetic disk therethrough. The slot 3a communicates with the disk loading passage between the upper guide plate 2 and the lower guide surfaces 1d.

Figure 4:
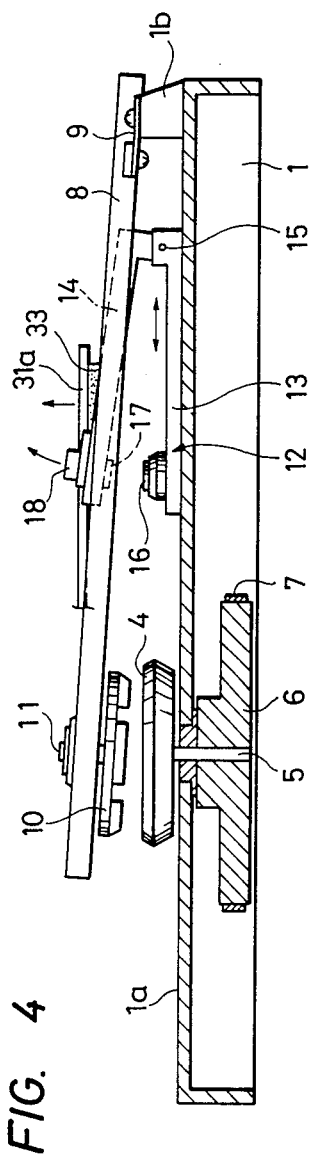
FIGS. 4 and 5 are cross-sectional views of the magnetic recording and reproducing apparatus, showing progressive steps of operation thereof.
Figure 5:
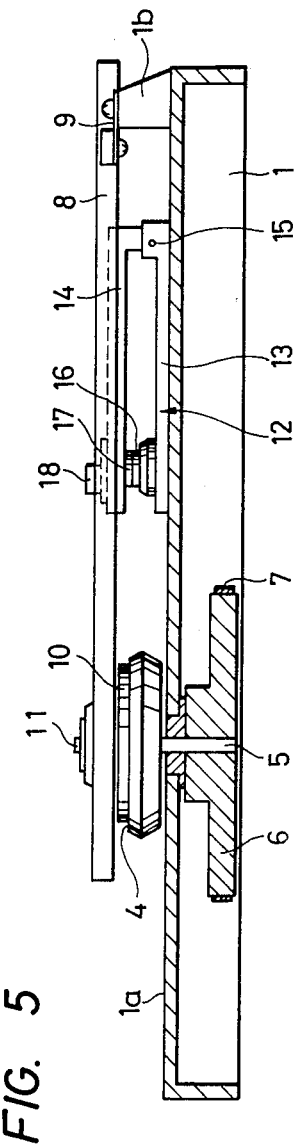

As illustrated in FIGS. 4 and 5, a turntable 4 is placed over the base 1. The turntable 4 has a flat upper surface including a central recess. The turntable 4 is fixed to a spindle 5 having a lower end to which a flywheel 6 is secured. A belt 7 is trained around the flywheel 6 and drivable by a motor (not shown). A clamp arm 8 is mounted on the flat surface 1a of the base 1 and has an end coupled by a leaf spring 9 to a support 1b on the base 1. A clamp member 10 is mounted on an opposite end of the clamp arm 8 in confronting relation to the turntable 4, the clamp member 10 being angularly movably supported on the clamp arm 8. When the clamp arm 8 is angularly moved downwardly as shown in FIG. 5, the clamp member 10 is fitted into the central recess in the turntable 4 to clamp a central portion of a magnetic medium in the disk. The clamp arm 8 is urged by the leaf spring 9 to move upwardly or in an unclamping direction.

A head carriage 12 is mounted on the base 1. The head carriage 12 is composed of a lower arm 13 and an upper arm 14 which are interconnected by a pin 15. A lower magnetic head 16 is mounted on the lower arm 13, while an upper magnetic head 17 is mounted on the upper arm 14. Accordingly, information is recorded on both sides of the magnetic medium in the illustrated embodiment. For an arrangement for recording information on one side of a recording medium, a magnetic head is mounted on one of the arms 13, 14, and a head pad is mounted on the other arm. The head carriage 12 is driven by a drive mechanism (not shwon) in a direction toward and away from the turntable 4 (that is, in the direction of the arrow in FIG. 4). The upper arm 14 is spring-loaded to move downwardly to cause the magnetic heads 16, 17 to sandwich the magnetic medium. A drive arm 18 is secured to an upper surface of the upper arm 14 (see FIG. 3).

Figure 6:
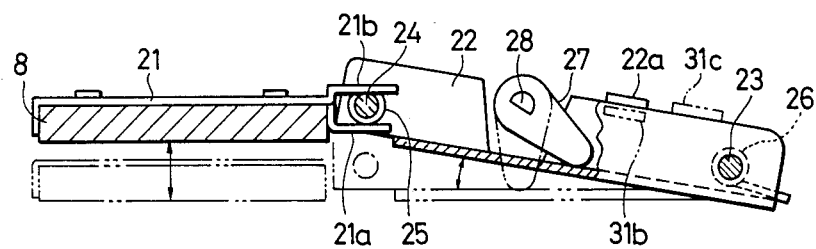
FIG. 6 is a side elevational view, partly in cross section, of a clamp arm lifted and lowered by a drive lever.

According to the present invention, as shown in FIGS. 3 and 6, a connector 21 is affixed to an upper surface of the distal end of the clamp arm 8 and includes two parallel engagement fingers 21a, 21b bent from a side edge of the connector 21. A drive lever 22 of a channel-shaped cross section is disposed laterally of the clamp arm 8 and has an end pivotally supported by a support shaft 23 on the base 1. A connector shaft 24 is secured to a distal end of the drive lever 22 with a collar 25 rotatably disposed around the connector shaft 24. The lower engagement finger 21a of the connector 21 fixed to the clamp arm 8 is positioned downwardly of the collar 25, while the upper engagement finger 21b is positioned upwardly of the connector shaft 24. As shown in FIG. 6, a spring 26 is disposed about the support shaft 23 for resiliently biasing the drive lever 22 upwardly. While the distal end of the the drive lever 22 is being lifted by the resilient force from the spring 26, the clamp arm 8 is also lifted under the force of the spring 9 so that the clamp member 10 is spaced from the turntable 4 in the unclamping condition.

An actuator cam 27 is located on the drive lever 22 and fixed to an actuator shaft 28 angularly movably supported on the base 1 and the front block 3. The actuator shaft 28 has an end projecting forward of the front block 3 with an actuator lever 29 secured to the projecting end of the actuator shaft 28. When the actuator lever 29 is in a horizontal position as shown by the solid line in FIG. 2 to open the disk insertion slot 3a in the front block 3, the actuator cam 27 coupled to the actuator lever 29 is in the position indicated by the solid line in FIG. 6, imposing no pressing force on the drive lever 22. When the actuator lever 29 is turned to the position indicated by the one-dot-and-dash line in FIG. 2, the actuator lever 29 closes the slot 3a and the actuator cam 27 is turned to the position indicated by the one-dot-and-dash line in FIG. 6 to lower the drive lever 22, thus lowering the clamp arm 8 in the clamping direction.

Figure 7:
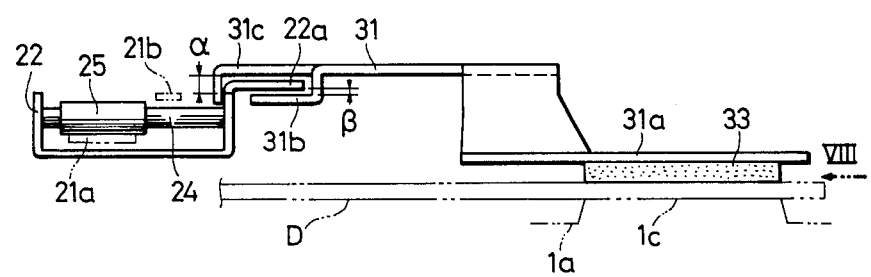
FIG. 7 is a side elevational view of a pad holder.
Figure 8:
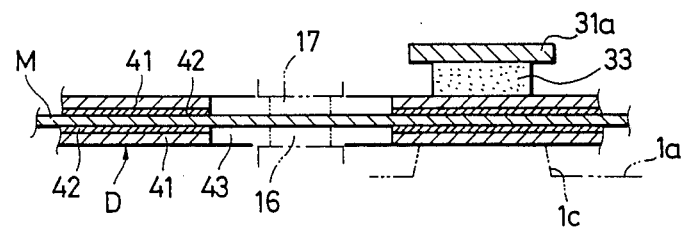
FIG. 8 is an enlarged side elevational view as seen in the direction of the arrow VIII.

A pad holder 31 is disposed in juxtaposed relation to the drive lever 22, the pad holder 31 being in the form of a metal sheet. The pad holder 31 has an end angularly movably supported by a support shaft 32 (or an extension of the support shaft 23), and includes an integral presser arm 31a on an opposite end, the presser arm 31a extending downwardly toward the base 1. A pad 33 is affixed to a lower surface of the presser arm 31a. The pad is made of a soft resilient material such as felt. A spring 34 (FIG. 3) is disposed around the support shaft 32 for resiliently urging the pad holder 31 to move in a direction to lower the pad 33. A reference land or raised surface 1c projects from the flat surface 1a of the base 1 as shown in FIGS. 7 and 8. The reference land 1c serves to accurately set a vertical position of a loaded disk D, and extends along the direction in which the head carriage 12 is movable in the vicinity of a read/write position in which information is read and writted by the magnetic heads 16, 17. The height of the reference land 1c from the flat surface 1a is determined with reference to the vertical position of the upper surface of the turntable 4 (or the height of a clamped magnetic medium M in the disk D), and the vertical position in which the magnetic medium is sandwiched by the magnetic heads 16, 17. The pad 33 is disposed upwardly of the reference land 1c in confronting relation thereto. When the pad holder 31 descends, the pad 33 presses the disk D against the upper surface of the reference land 1c. The pad holder 31 has an engagement member 31c on an edge thereof, which is disposed above a bent sidewall of the drive lever 22, so that when the drive lever 22 is lifted, the pad holder 31 is also raised by the engagement member 31c. When the drive lever 22 is depressed by the actuator cam 27 to lower the clamp arm 8 in the clamping direction, the drive lever 22 is spaced a distance $\alpha$ from the engagement member 31c as shown in FIG. 7, and the pad holder 31 is lowered only under the resilient force of the spring 34 (FIG. 3) so that the pad 33 is pressed against the disk D under the constant spring force. The pad holder 31 also has an engagement member 31b on an edge thereof, which is bent so as to be slightly lower than the general plane of the pad holder 31. The drive lever 22 has a bent stopper 22a in vertically aligned relation to the engagement member 31b. When the drive lever 22 is lowered as shown in FIG. 7, the stopper 22a confronts the engagement member 31b thereabove with a small gap $\beta$ left therebetween. If an undue upward force acts on the pad holder 31, then the engagement member 31b abuts against the stopper 22a, whereupon the pad holder 31 will not be raised beyond a required vertical interval.

The drive arm 18 on the upper arm 14 of the head carriage 12 extends over and across the clamp arm 8 in overhanging relation to the presser arm 31a of the pad holder 31.

As shown in FIG. 8, the disk D to be loaded in the magnetic recording and reproducing apparatus includes a flexible disk-shaped magnetic medium M rotatably stored in a case 41 of paper. A liner 42 as of nonwoven fabric is attached to an inner surface of the case 41. The case 41 has a central drive hole in which a central portion of the magnetic medium M is clamped by the turntable 4 and the clamp member 10. The case 41 has a read/write hole 43 through which the magnetic heads 16, 17 contact the magnetic medium M.

Operation of the magnetic recording and reproducing apparatus and the disk presser mechanism thus constructed will be described hereinbelow.

Figure 2:
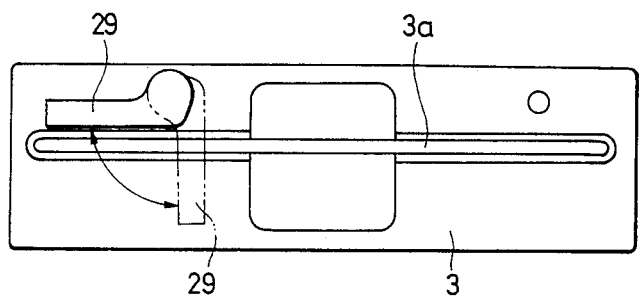
FIG. 2 is a front elevational view showing a disk insertion slot in a front block of in the magnetic recording and reproducing apparatus.

The disk D is inserted into the apparatus through the slot 3a in the front block 3, and the actuator lever 29 is turned to the dot-and-dash-line position of FIG. 2 to close the slot 3a. The turning movement of the actuator lever 29 is transmitted through the actuator shaft 28 to the actutator cam 27, which is then turned to the dot-and-dash-line position of FIG. 6 to depress the drive lever 22 downwardly in FIG. 6. The turning movement of the drive lever 22 is in turn transmitted through the connector shaft 24 and the collar 25 to the engagement finger 21a to lower the clamp arm 8 in the clamping direction to the position shown in FIG. 5. As a result, the clamp member 10 on the distal end of the clamp arm 8 presses the central portion of the magnetic medium M in the disk D against the turntable 4 thereby to clamp the magnetic medium M in position.

As the drive lever 22 descends, it frees the engagement member 31c of the pad holder 31 which is then lowered under the resiliency of the spring 34. While the disk D is clamped, the pad 33 on the presser arm 31a of the pad holder 31 presses a portion of the disk D near the read/write hole 43. The disk D is now positioned by being sandwiched between the reference land 1c of the base 1 and the pad 33 as shown in FIG. 8. When the drive lever 22 is moved downwardly as described above, the side edge of the drive lever 22 is spaced the distance a from the engagement member 31c of the pad holder 31 (FIG. 7). Therefore, the pad 33 on the pad holder 31 is pressed against the disk D only under the force of the spring 34. The pad 33 thus presses the disk D down against the reference land 1c under the same pressure at all times dependent on the force of the spring 34. In the position of FIG. 7, the stopper 22a of the drive lever 22 confronts the engagement member 31b of the pad holder 31 thereabove with the small gap left therebetween. This arrangement prevents the pad holder 31 from being moved upwardly if an excessive upward force is accidentally applied to the pad holder 31.

When a read or write signal is applied after the central portion of the magnetic medium M has been clamped by the clamp member 10, the turntable 4 is driven by the motor to rotate the magnetic medium M. As shown in FIGS. 5 and 8, the magnetic heads 16, 17 sandwich the magnetic medium M therebetween under the pressing force from the upper arm 14. When the head carriage 12 is reciprocally move in the direction of the arrow in FIG. 4 in response to signals applied, information is read from or written into tracks on the magnetic medium M by the magnetic head 16 or 17.

Since the pad 33 presses the disk D under the constant force at all times, the liner 42 on the inner surface of the case 41 is held in contact with the magnetic medium M under appropriate forces (FIG. 8). Therefore, the magnetic medium M is self-cleaned by the liner 42 while the magnetic medium M is being rotated during recording and reproducing operation.

When the disk D is to be removed, the actuator lever 29 is turned to the solid-line position of FIG. 2 to open the slot 31. Since the actuator cam 27 is also rotated with the actuator lever 29 to the solid-line position of FIG. 6, the drive lever 22 is released of the pressing force from the actuator cam 27. As a consequence, the drive lever 22 is turned upwardly under the force of the spring 26. Released from the drive lever 22, the clamp arm 8 is turned upwardly under the force from the leaf spring 9, whereupon the disk D is unclamped by the clamp member 10.

When the drive lever 22 is turned upwardly in the unclamping direction, the drive lever 22 pushes the engagement member 31c upwardly to turn the pad holder 31 upwardly. The pad 33 is now moved out of contact with the disk D to release the latter.

When the clamp arm 8 is turned in the unclamping direction, the clamp arm 8 pushes up the drive arm 18 in an initial period to raise the upper arm 14 of the head carriage 12 against the force of the spring, thus releasing the magnetic head 17 from the magnetic medium M. As the clamp arm 8 is turned upwardly through a prescribed angle, the presser arm 31a of the pad holder 31 as it ascends as described above pushes up the drive arm 18, until finally the presser arm 31a raises the drive arm 18 and the upper arm 14 to a large extent. That is, at the time the disk D is to be unclamped, the upper arm 14 supporting the magnetic head 17 is lifted initially by the clamp arm 8, and after having ascended to a certain extent, the upper arm 14 is then lifted by the presser arm 31a. Therefore, the upper arm 14 can be raised to a suffcient interval even if the clamp arm 8 is turned through a small angle when the disk D is unclamped. The disk D can then smoothly be ejected since there is no danger of the magnetic disk 17 hitting the disk D being ejected.

Although a certain preferred embodiment has been shown and described, it should be understood that many changes and modifications may be made therein without departing from the scope of the appended claims.

What is claimed is:

1. A disk presser mechanism for a recording/reproducing apparatus of the type comprising a housing having a front portion with an opening therein for insertion of a magnetic recording disk, means in said housing defining a horizontal path for insertion of the disk, a base in the housing supporting a rotatably driven turntable on which the disk is clamped, and a clamp member mounted on a pivotable clamp arm in said housing in an upward direction above said turntable so as to be movable in a downward direction toward said turntable, said disk presser mechanism comprising:
   a pivotable drive lever coupled to a movable end of said clamp arm for moving it downwardly toward said turntable, said drive lever being biased by biasing means toward an upward position;
   an actuator including an operation portion extending from said front portion of said housing and a rotatable cam portion positioned in said housing so as to engage said drive lever and pivot it downward upon rotation of said operation portion;
   a pad holder mounted in said housing separately from said clamp lever, said drive lever and said actuator and having a pad for pressing against a portion of a disk when it is clamped on said turntable;
   urging means mounted in said housing separately from said clamp lever and said drive lever for urging said pad holder in an downward direction toward a disk on said turntable;
   said pad holder including an engagement member which is disposed above a portion of said drive lever such that said pad holder is raised by the engagement member in an upward position when said drive lever is moved to an upward position, and said drive lever becomes spaced by a small distance from the engagement member when said drive lever is moved to a downward position to clamp a disk on the turntable, thereby allowing said pad holder to be urged downwardly to press said pad on the disk only by said urging means when said drive lever is in the downward position;

whereby said pad holder presses said pad against the disk only by the force of said urging means so that a relatively even pressure can be obtained and a loading pressure of said clamp arm or of said drive lever is not applied on said pad holder.

2. A disk presser mechanism according to claim 1, wherein said drive lever has one end operatively coupled to said clamp arm and an opposite end pivotally mounted on said guide plate, said engagement means comprising an engagement member extending from said pad holder in overhanging relation to a sidewall of said drive lever.

* * * * *

UNITED STATES PATENT AND TRADEMARK OFFICE
CERTIFICATE OF CORRECTION

PATENT NO. : 4,740,852

DATED : April 26, 1988

INVENTOR(S) : Yukiya Shiraishi, Takeshi Yamashita

It is certified that error appears in the above-identified patent and that said Letters Patent is hereby corrected as shown below:

Col. 6, line 63, change "in an downward" to --in a downward--.

Signed and Sealed this

Fourteenth Day of March, 1989

Attest:

DONALD J. QUIGG

*Attesting Officer*       *Commissioner of Patents and Trademarks*